United States Patent
Back et al.

(10) Patent No.: US 9,546,684 B2
(45) Date of Patent: Jan. 17, 2017

(54) SEAL UNIT FOR ROLLING-ELEMENT BEARING AND ROLLING-ELEMENT BEARING INCLUDING THE SEAL UNIT

(71) Applicants: Femke Back, Schweinfurt (DE); Jens Bettenhausen, Würzburg (DE); Steffen Hain, Karlstadt (DE); Matthias Hofmann, Schweinfurt (DE); Henning Kern, Schweinfurt (DE); Jochen Lorenscheit, Rimpar (DE); Christina Pfeuffer, Eußenheim (DE); Edgar Pickel, Sommerach (DE); Werner Schleyer, Reckendorf (DE); Mathias Seuberling, Großeibstadt (DE)

(72) Inventors: Femke Back, Schweinfurt (DE); Jens Bettenhausen, Würzburg (DE); Steffen Hain, Karlstadt (DE); Matthias Hofmann, Schweinfurt (DE); Henning Kern, Schweinfurt (DE); Jochen Lorenscheit, Rimpar (DE); Christina Pfeuffer, Eußenheim (DE); Edgar Pickel, Sommerach (DE); Werner Schleyer, Reckendorf (DE); Mathias Seuberling, Großeibstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/571,401

(22) Filed: Dec. 16, 2014

(65) Prior Publication Data
US 2015/0176651 A1    Jun. 25, 2015

(30) Foreign Application Priority Data
Dec. 19, 2013 (DE) .......... 10 2013 226 557

(51) Int. Cl.
F16C 23/08    (2006.01)
F16C 33/36    (2006.01)
(Continued)

(52) U.S. Cl.
CPC .............. *F16C 33/76* (2013.01); *F16C 23/06* (2013.01); *F16C 33/7806* (2013.01);
(Continued)

(58) Field of Classification Search
CPC ....... F16C 23/08; F16C 23/082; F16C 23/084; F16C 23/086; F16C 23/088; F16C 33/7823; F16C 33/7826; F16C 33/783; F16C 33/784; F16C 33/7853; F16C 33/7856; F16C 2300/14; F16C 33/7886; F16C 33/7889
(Continued)

(56) References Cited

U.S. PATENT DOCUMENTS 2,298,463 A * 10/1942 Burt, Jr. ............... F16C 23/086
                                                          277/369
2,764,433 A    9/1956 Cobb
(Continued)

FOREIGN PATENT DOCUMENTS

CN    203285841 U  * 11/2013
DE    102005041917 A1    3/2007
(Continued)

*Primary Examiner* — Phillip A Johnson
(74) *Attorney, Agent, or Firm* — Bryan Peckjian; SKF USA Inc. Patent Dept.

(57) ABSTRACT

A seal unit for a rolling-element bearing having an inner bearing ring and an outer bearing ring. The seal unit includes an at least part-ring shaped element having a seal lip, the at least part-ring shaped element is configured for attachment to the inner bearing ring, and the outer bearing ring is tiltable through a limited angle with respect to the inner bearing ring. Also a rolling-element bearing having such a seal unit.

13 Claims, 10 Drawing Sheets

(51) Int. Cl.
*F16C 33/78* (2006.01)
*F16C 33/76* (2006.01)
*F16C 23/06* (2006.01)

(52) U.S. Cl.
CPC ...... *F16C 33/7856* (2013.01); *F16C 33/7889* (2013.01); *F16C 23/086* (2013.01)

(58) Field of Classification Search
USPC ........................................ 384/484, 558, 568
See application file for complete search history.

(56) References Cited

U.S. PATENT DOCUMENTS

| | | | | | |
|---|---|---|---|---|---|
| 3,368,853 | A | * | 2/1968 | Van Wyk | F16C 19/183 |
| | | | | | 277/369 |
| 3,748,003 | A | * | 7/1973 | Barber | F16C 23/086 |
| | | | | | 277/365 |
| 4,755,067 | A | * | 7/1988 | Asberg | F16C 23/086 |
| | | | | | 277/376 |
| 5,005,992 | A | * | 4/1991 | Dreschmann | F16C 23/086 |
| | | | | | 384/482 |
| 5,413,416 | A | * | 5/1995 | Grunze | F16C 23/086 |
| | | | | | 384/568 |
| 5,441,351 | A | * | 8/1995 | Grunze | F16C 23/086 |
| | | | | | 384/450 |

FOREIGN PATENT DOCUMENTS

| | | | | |
|---|---|---|---|---|
| DE | 102007036891 A1 | | 2/2009 | |
| DE | WO 2011138107 A1 | * | 11/2011 | ............ F16C 23/086 |
| DE | WO 2012069458 A1 | * | 5/2012 | ............ F16C 23/086 |
| DE | 102011078840 A1 | | 1/2013 | |
| DE | WO 2013007545 A1 | * | 1/2013 | ............ F16C 33/768 |
| GB | 808943 A | * | 2/1959 | .......... F16C 33/7806 |
| GB | 1098451 A | | 1/1968 | |
| JP | 2004150477 A | | 5/2001 | |
| WO | WO 2007127851 A1 | * | 11/2007 | ............ F16C 23/086 |

* cited by examiner

SEAL UNIT FOR ROLLING-ELEMENT BEARING AND ROLLING-ELEMENT BEARING INCLUDING THE SEAL UNIT

CROSS-REFERENCE

This application claims priority to German patent application no. 10 2013 226 557.3 filed on Dec. 19, 2013, the contents of which are fully incorporated herein by reference.

TECHNOLOGICAL FIELD

The present disclosure is directed to seals for rolling-element bearings and to rolling-element bearings having seals.

BACKGROUND

Known bearing seals can protect a rolling-element bearing against dirt and contamination. However, these seals are generally configured for use with a bearing of a particular type or size and can only be adapted with difficulty for use with other bearings. This limits the number of each seal made and requires manufacturing seals of many different sizes and shapes. In addition, it can be difficult to replace an installed seal because a complex and cost-intensive disassembly effort is often needed to remove parts to allow the seal to be replaced. This is a particular problem in the field of large bearings having a diameter of approximately 400 millimeters or larger, bearings used, for example, in wind turbines.

Figure 10:
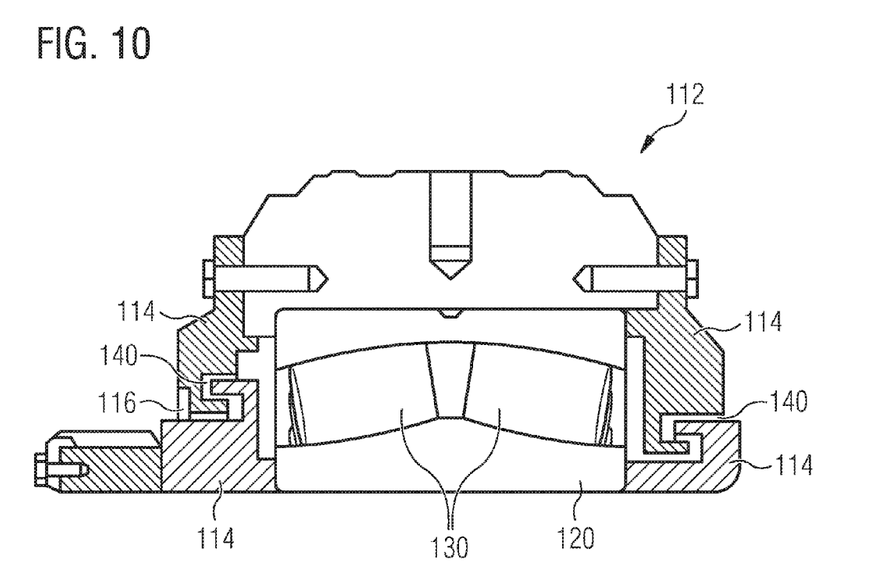
FIG. 10 shows a conventional construction of a labyrinth seal as a comparative example.

FIG. 10 illustrates a conventional seal in a large bearing 112 as a comparative example. The large bearing 112 is sealed on two sides by so-called labyrinths (labyrinth seals) 140 which are formed by labyrinth rings 114. The seal is accordingly composed of labyrinth rings 114 provided on both sides, which form labyrinth-shaped sealing gaps, the so-called labyrinths 140. The meandering geometry of the labyrinths 140 thus formed makes it harder for foreign matter to penetrate into the region to be sealed, for example, to the rolling elements 130 or the raceways of the bearing rings 120. In this seal variant, all of the intervening spaces of the labyrinth 140 and also of the rolling-element bearing 112 is usually filled with grease or lubricant. In addition, a supporting, so-called V-ring 116 can be used on or in the labyrinth 140. The sealing effect can be additionally supported by periodic relubrication. All of the components mentioned can be cost factors. Moreover, the labyrinth rings 114 forming the labyrinth 140 extend beyond the width of the actual rolling-element bearing 112, in other words beyond the width of the bearing ring 120, and can thereby occupy valuable space inside a machine. The most massive embodiments of the labyrinth rings 114, for example, those made from cast iron such as grey cast iron, create further assembly and operational disadvantages due to their own weight.

In addition, according to a further comparative example, bearings, including large bearings, can be protected by contacting sealing rings. These rings are essentially radial shaft seal rings, possibly including upstream dust lips, which are held in position using, e.g., cast support parts. These support parts likewise may have a large mass and thus add a large weight that must be moved during assembly. These seal rings are also difficult or impossible to exchange or replace without significant expense.

The two above-mentioned sealing concepts have the segregation from the rolling-element bearing in common. Therefore, the bearings can only be filled with lubricant in the assembled state. Such seals can only be installed after the assembly of the bearing, and only thereafter can the bearing be filled with lubricant.

In addition, integrated sealing concepts are known which are embodied purely from elastomer, and may be, e.g. bellows-shaped (see German patent document DE 10 2007 036 891 A1). Bearings with such seals scan be prelubricated—at a factory before delivery, for example. However, it may be difficult to achieve (or adequately achieve) the required seal system stiffness for large bearing diameters. Moreover, due to the closed geometry of the seal ring, it may be difficult or impossible to exchange the seal without disassembling the rolling-element bearing.

The existing sealing concepts discussed herein also accommodate only a limited bearing misalignment or tilt and fail to provide adequate sealing when a maximum tilt is exceeded. Especially in the case of self-aligning bearings, such as spherical roller bearings or compact aligning roller bearing (CARB) toroidal roller bearings, the maximum possible tilting of a bearing inner ring with respect to a bearing outer ring can be severely limited by conventional seals. This can lead, during installation of the bearing or in actual operation, to a rolling-element bearing roller bumping against the seal element. This in turn may damage the roller set, the seal element, or even the attachment mechanism on the respective bearing ring and lead to significant repair costs or an impairment of the service life of the bearing.

SUMMARY

There is therefore a need to provide an improved concept for sealing rolling-element bearings.

According to a first aspect of the disclosure, a seal unit for a rolling-element bearing is provided which seal unit comprises an at least part-ring shaped element including a seal lip. As used herein "at least part-ring shaped" refers to a complete ring, an arc-shaped ring segment, a disc having an arcuate outer portion or a partial disk. The at least part-ring shaped element includes an attachment means or mechanism for attaching to a bearing ring of the rolling-element bearing. Furthermore, the seal unit can be manufactured at least partially from a flexible, elastic material including, without limitation, elastomers, i.e. certain types of plastic or rubber-type materials. The term "seal unit" indicates that a penetration of certain substances from one side of the seal unit to the other is to be prevented. These substances can include dirt particles (e.g. soot, fine dust, sand, or mud), gases or vapors (e.g. oxygen, vapors of fuels or solvents, or also vapors of toxic or corrosive substances) or liquids (e.g. water, acids, lyes, oil), or also materials such as, e.g., greases.

The rolling-element bearing can be embodied in different forms, for example, as a ball bearing, a barrel roller bearing, or a tapered roller bearing; moreover, it can have a single-row or multi-row arrangement of rolling elements. An at least part-ring shaped element can, for example, be formed by a complete ring, or also by parts of a ring, for example by segments. In addition to ring segments, however, embodiments are also possible wherein a ring can be assembled, for example, from parts having irregular shape. An embodiment in a plurality of parts of a ring can significantly facilitate maintenance since, for example, the installation and removal can occur without a complete removal of the entire rolling-element bearing. Using the seal lip a sealing contact could be made with a further component of the rolling-element bearing, such as a bearing ring. The seal unit and the seal lip may then be manufactured from different materials. The seal lip or the entire seal unit can be at least partially manufactured from a seal material.

A seal material can be, for example, a plastic, e.g. polyurethane, nitrile rubber (nitrile butadiene rubber (NBR), or hydrated nitrile butadiene rubber (HNBR)), depending on the type of material that is to be prevented from penetrating or escaping. The seal unit could be manufactured at least partially from metal, metal alloys, or plastics, particularly low-friction plastics such as, e.g., polytetrafluoroethylene (PTFE), or plastics having high stiffness. Plastics having high stiffness could be so-called thermosets (thermosetting materials). In addition, the seal lip or sealing unit can be manufactured at least partially from rubber-type materials, or from plastics having low stiffness; these can be, for example, elastomers or some thermoplasts (thermoplastic materials). The use of seal materials during manufacture could effect less wear on a sliding surface as well as good sealing, and any collisions with rolling elements could be significantly damped by the material. Furthermore, the materials used could allow for the mass production of the seals by methods such as injection molding, vulcanization, etc. Production costs and material costs as well as weight can thus be saved.

The attachment of the seal to the rolling-element bearing can take place in an interference-fit, friction-fit, or materially bonded manner. Possible attachment means (mechanisms) could comprise, for example, a screw, an adhesive surface, a welded surface, a soldered joint, a rivet, a bore, a thread, or a system including a groove and spring. The bearing ring of the rolling-element bearing can be a bearing inner ring or a bearing outer ring. Furthermore, in some exemplary embodiments the element can be plate-shaped. A plate-shaped element can also be understood to be a thin element; in other words, one of the three spatial dimensions (thickness) could be very small with respect to the other two spatial dimensions (length, width). In exemplary embodiments the thickness could respectively be up to 1%, 2%, 5%, 10%, etc. of the length or width. Using a plate-shaped embodiment of the element, a significant amount of volume (installation space) and thus also weight can be saved. Furthermore, it could also be possible to manufacture the element and the seal lip from one piece or from the same material. If, for example, the element is segmented, a connection of the individual plates can be formed, for example, by connecting plates, screws, adhesion, or welding.

Moreover, in some exemplary embodiments the seal unit can be integrated into an already-existing rolling-element bearing. Due to its simple construction, the seal could be used on any rolling-element bearing, independent of the bearing design, bearing series, or bearing diameter. The seal unit could be used flexibly in multiple environments. Compared to the conventional solution of the labyrinth seal, such as is used, for example, in wind turbines, the space to be filled by a lubricant could be substantially reduced, thus reducing the amount of lubricant needed. Moreover, in some exemplary embodiments the seal unit can be made from lightweight material. This could lead to a reduction of material costs and a weight reduction, and thus to a simplified, time-efficient installation. Factory prelubrication reduces or even prevents contamination during the installation of the otherwise unsealed, open bearing.

In addition, in exemplary embodiments the seal element can be an at least part-disk shaped element. "At least part-disk shaped" means that the element can form a segment of a complete circular disk or an arbitrarily shaped part of a complete circular disk, and a plurality of such elements can be assembled into a complete circular disk. The element could also already form a complete circular disk. The element could then, for example, be used for sealing a hollow shaft which ends or terminates flush on a bearing after installation thereon.

Additionally or alternatively, the element may have a diameter or a radius of at least 400 mm. The diameter or radius of at least 400 mm here can refer to a circle which extends (partially) along the circumference of a ring- or disk-shaped (or part-ring- or part-disk-shaped) element. With reference to a bearing, the diameter or the radius can be measured radially to an axis of rotation of the bearing. Bearings having an outer diameter or outer radius of 400 mm or more are often referred to as "large bearings." Large bearings can be used, for example, in the field of energy generation (e.g. wind turbines, underwater turbines, turbines in general). With a large bearing, maintenance, installation, or replacement of a conventional seal can be difficult and expensive. The embodiment of the element in a plurality of disk-parts or ring-parts could significantly reduce this expense.

Additionally or alternatively, a seal surface of the seal lip may extend beyond the element in the axial direction. In an exemplary embodiment the seal lip can engage on a slanted surface of the bearing ring from a direction that has an axial vector component other than zero. The tip of the seal lip profile or the seal surface can thus abut axially on the bearing ring in a rest position of the bearing. The interior of the bearing could thus be protected from an entry of moisture, dirt, or foreign particles.

Additionally or alternatively, the seal element may include a groove for attaching a stiffening element to the seal element. For example, the seal unit can also be manufactured from an elastomer. The thermal expansion coefficient of the sealing material used (i.e., for example, elastomer) can significantly exceed that of rolling-element bearing steel. In order to achieve a centering of the seal lip with respect to the counter-surface or counter-raceway, even with heating, a recess or groove can be provided in the element into which a stiffening element, for example a steel band or steel cable, is inserted. As a result a possibly greater expansion of the sealing material as compared to that of the rolling-element bearing can be compensated for.

In addition, the inserted sealing element could ensure an improved, more uniform, or optimal distribution of the contact pressure of the seal lips on the counter surface around the entire circumference of the inner ring. A self-centering could thus be realized, and no further centering measures would be required. The danger of leakage could thus be effectively reduced.

Optionally in such an exemplary embodiment the groove lies closer to the seal lip than to the attachment means. In such an exemplary embodiment the groove optionally also comprises a stiffening element. The closer the groove lies to the seal lip, the better the counter surface could be controlled by the contact pressure of the seal lip. In other exemplary embodiments, however, the groove could also be farther from the seal lip than from the attachment element. The stiffening element could be connected to the element in a friction-fit, interference-fit, or materially bonded manner. The presence of a stiffening element could prove beneficial, for example, in application environments wherein the bearing is subjected to large temperature fluctuations.

The seal unit may additionally or alternatively be formed in a unitary manner, that is, as a single piece. A "one-piece component" is understood to mean a component that is manufactured from one continuous piece of material. A "component or structure provided or manufactured one-part" or a "component or structure provided or manufactured integrally with at least one further component or structure" is understood to mean one which cannot be separated from the at least one further component without destroying or damaging one of the at least two participating components. A one-piece component thus also represents at least one component integrally manufactured or one-part with another structure of the respective component.

Additionally or alternatively, the attachment means lies radially inward or outward relative to the seal lip. In other words, in some exemplary embodiments the seal unit can be attached to a bearing inner ring or also to a bearing outer ring. If the seal unit is attached to the bearing outer ring, the surface to be sealed could thereby be reduced and a part of the sealing material, from which the seal is manufactured, could be saved. On the other hand, if the seal unit is attached to the bearing inner ring, for example in certain spherical roller bearings, a collision of the rolling elements or of a bearing cage with the seal unit can be avoided when the bearing tilts.

Additionally or alternatively, the seal unit is replaceably connectable to the bearing ring. Here "replaceably connectable" means that the seal unit can be connectable, replaceable, or reversibly connectable to the bearing ring. The connection can thus be releasable and restorable, so that no damage to the bearing ring or the seal unit results. It could also be possible to exchange, install, or remove only of the part-ring shaped element. Likewise the insertion, removal, or exchange could occur at low cost and without damage.

Furthermore, exemplary embodiments additionally or alternatively relate to a bearing including at least one bearing ring and including a seal unit which comprises at least one part-ring shaped element. Here the element ends or terminates flush with the bearing ring in the axial direction. In other words, the element could be surroundable by a recess of the bearing ring at least partially and in such a manner that an outer-lying (i.e. facing away from a rolling element of the rolling-element bearing) surface of the sealing element ends flush with (lies in the same plane as) an outer-lying surface of the bearing ring after the seal element is connected to the bearing ring. In exemplary embodiments the sealing element can be prevented from extending beyond the bearing ring in the axial direction. The required installation space for the bearing could thereby be reduced, optionally reduced to a minimum. It could thereby be possible, for example, to maintain an installation space specified by the International Organization for Standardization (ISO).

In such an exemplary embodiment wherein the element includes a groove for attaching a stiffening element, a stiffening element is optionally introduced into the groove. Furthermore, in some exemplary embodiments the stiffening element can have a thermal expansion coefficient which substantially corresponds to the thermal expansion coefficient of a bearing ring. The more precisely the thermal expansion coefficients of the stiffening element and of the bearing ring match, the more efficiently the centering of the seal lip could be preserved with temperature fluctuations. The term "substantially" means that in an exemplary embodiment the thermal expansion coefficient of the stiffening element and of the bearing ring could differ from each other by up to 1%, 2%, 5%, or 10%.

In such an exemplary embodiment the bearing optionally comprises two bearing rings tiltable with respect to each other by a limited angle. Such tilting occurs, for example, in spherical roller bearings.

In some exemplary embodiments the maximum possible tilting of two bearing rings with respect to each other can be a fraction of a degree, but also a plurality of degrees, for example 2 or 3 degrees. As already mentioned, the seal unit can be attached, e.g., on the inner bearing ring, so that a collision with the rolling elements during a tilting of the two bearing rings with respect to each other can be avoided. The use of a seal lip, which can be manufactured, for example, from elastomer, could provide so much clearance during tilting that the sealing function of the seal lip is maintained even with a tilting, for example, of one or two degrees. If the seal unit is attached to the outer bearing ring, a manufacturing of the seal unit from plastic, for example, could significantly reduce damage during severe tilting of both bearing rings with respect to each other, which damage could result from a collision of the seal unit with the rolling elements.

Furthermore, in exemplary embodiments, the seal unit additionally or alternatively includes at least one liquid-permeable or grease outlet bore. If such grease outlet bores are incorporated in the seal unit, used lubricant could be discharged in an efficient and directed manner using hoses/tubes or collecting tanks attached directly to the bores. Contamination of surrounding components and of the surrounding space could thus be avoided.

BRIEF DESCRIPTION OF THE DRAWINGS

Exemplary embodiments are described and explained in more detail below with reference to the accompanying Figures wherein.

DETAILED DESCRIPTION

In the following description of the accompanying Figures, which show exemplary embodiments of the present disclosure, identical reference numerals indicate identical or comparable components. Furthermore, summarizing reference numerals may be used for components and objects that appear multiple times in an exemplary embodiment or in an illustration but that are described together in terms of one or more common features. Components or objects that are described with the same or summarizing reference numerals can be embodied identically, but also optionally differently, in terms of individual, multiple, or all features, their dimensions, for example, as long as the description does not explicitly or implicitly indicate otherwise.

In the following, lower-case letters "a" and "b" appended to a reference numeral respectively refer to different exemplary embodiments. Thus, for example, the reference numerals "10a" and "10b" can indicate two counterparts/instances of the same component in respective different embodiments.

In the following description a first exemplary embodiment is described with reference to FIGS. 1-4, and a second exemplary embodiment is described with reference to FIGS. 5-9.

Figure 1:
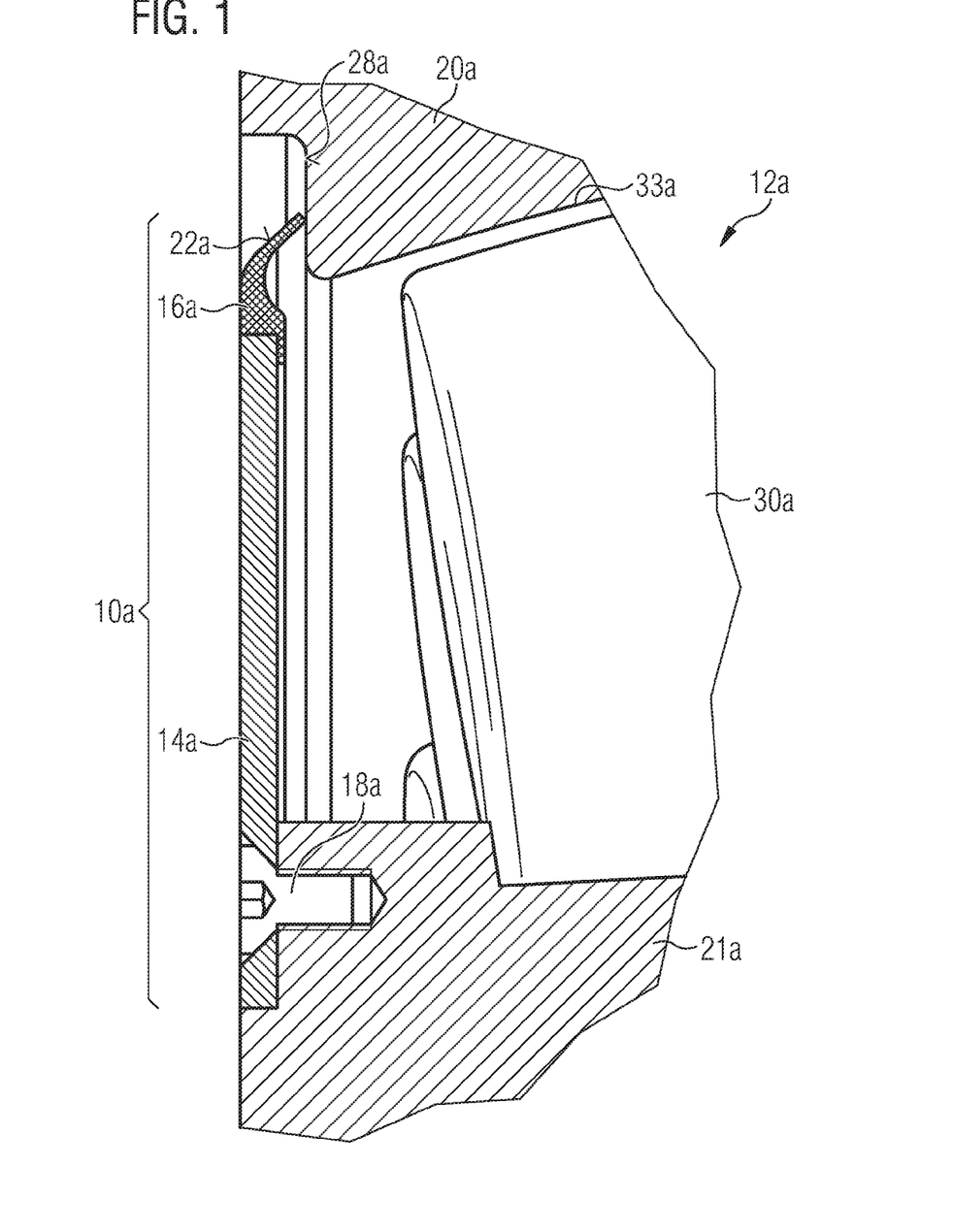
FIG. 1 is a side elevational view, partly in section, of a seal unit for a rolling-element bearing according to a first exemplary embodiment.

FIG. 1 shows a seal unit 10a for a rolling-element bearing 12a according to a first exemplary embodiment. Exemplary embodiments relate to a seal unit 10a; 10b for a rolling-element bearing 12a; 12b, wherein the seal unit 10a; 10b comprises an at least part-ring shaped element 14a; 14b including a seal lip 16a; 16b, and wherein the at least part-ring shaped element 14a; 14b includes an attachment means or mechanism 18a; 18b for attaching to a bearing ring 20a; 20b; 21a; 21b of the rolling-element bearing 12a; 12b.

The attachment means 18a is depicted as a screw in the exemplary embodiment of FIG. 1, but could also alternatively be, for example, a bolt, an adhesive surface, a weld surface, or a solder surface. In addition, in FIG. 1 an outer bearing ring 20a and an inner bearing ring 21a are shown. The seal unit 10a comprises an at least part-ring shaped element 14a including a seal lip 16a. Furthermore, a plurality of rolling elements 30a are visible in the cross-sectional depiction shown in FIG. 1, which are barrel shaped in the exemplary embodiment. In addition, however, other configurations of the rolling elements 30a are possible, for example as balls, tapered rollers, or cylinders. In different exemplary embodiments, the rolling elements 30a can be disposed in one or more rows in rolling-element bearing 12a.

In FIG. 1 the raceway 33a of the outer bearing ring 20a has a shape which forms a part of a spherical shell. The radius of curvature of the spherical shell corresponds, in the context of manufacturing tolerances, to the radius of curvature of the barrel-shaped rolling elements 30a. A tilting of the two bearing rings 20a; 21a with respect to each other is thus possible.

Furthermore, in exemplary embodiments a seal surface 22a; 22b of the seal lip 16a; 16b can extend beyond the element 14a; 14b in the axial direction. The seal lip 16a includes a seal surface 22a on the axially opposite side of the seal from the side facing the rolling elements 30a in addition to a seal surface at the tip of the seal lip 16a. In addition, the outer bearing ring 20a includes a retracted or inset surface 28a which functions as the seal surface 28a of the bearing ring 20a and is in abutment with the seal surface of the seal lip 16a. As is exemplarily depicted in FIG. 1, the seal unit 10a can be realized by an element 14a and a seal lip 16a. In the not-deflected position, the seal surface 22a of the seal lip 16a lies in the region of the seal surface 28a of the outer bearing ring 20a, axially against the outer bearing ring 20a and thus protects the interior of the rolling-element bearing 12a from entry of moisture, dirt, foreign particles, etc. The attachment of the element 14a is accomplished in FIG. 1 by screws; however it could also occur using, e.g., clamping or adhesion. The seal lip 16a could be fixed on the element 14a, for example, by vulcanization, adhesion, clamping, screwing, or by interference-fit.

As already mentioned, a one-piece embodiment of the seal unit 10a could be possible in which the element 14a and the seal lip 16a are manufactured from one material. If the exemplary embodiment shown in FIG. 1 is used with self-centering rolling-element bearings 12a, such as, for example, spherical roller bearings and CARB toroidal roller bearings, a collision of the rolling elements 30a with the seal unit 10a could thus be avoided. The rolling elements 30a could be guided by the flange geometry of the bearing inner ring 21a (e.g. a raceway groove). In this way the seal unit 10a can follow the tilt of the bearing ring 21a in an equal manner to the rolling elements 30a. The minimum possible spacing of the rolling elements 30a and seal unit 10a could consequently remain constant and thus a collision could be prevented. If the outer diameter of the element 14a is chosen such that the raceways of the outer bearing ring 20a and the element 14a do not touch even with severe tilting, contact can be maintained with the seal lip 16a without problems even if an "excessive" bearing tilt occurs in which the seal unit 10a "intrudes" into the bearing interior. Here the seal lip 16a could be made sufficiently flexible due to an appropriate selection of seal lip geometry and choice of material.

In exemplary embodiments the seal unit 10a; 10b can be exchangeably (removably) connectable to the bearing ring 20a; 20b; 21a; 21b. The seal lip 16a; 16b, the element 14a; 14b, or the entire seal unit 10a; 10b can be simply removed and replaced by suitable selection of attachment of the element 14a; 14b on the bearing ring 20a; 20b; 21a; 21b and/or the seal lip 16a; 16b on the element 14a; 14b. Cost-intensive maintenance work on the rolling-element bearing units can thereby be reduced. In addition, a visual and manual inspection of the prominent regions of the rolling-element bearing 12a; 12b, such as raceways, rolling elements 30a; 30b, or cages can be made because of the above-mentioned simple removal of the seal unit 10a; 10b. Likewise, targeted grease samples could be taken for lubricant analysis because now all regions of the rolling-element bearing 12a; 12b can be opened and thus freely accessible. Due to the greatly simplified construction in comparison to the conventional solution, investments needed for prototypes and small quantities could be more economical. For an intended series production, the known manufacturing methods, such as injection molding, vulcanization, or others could be used.

Figure 2:
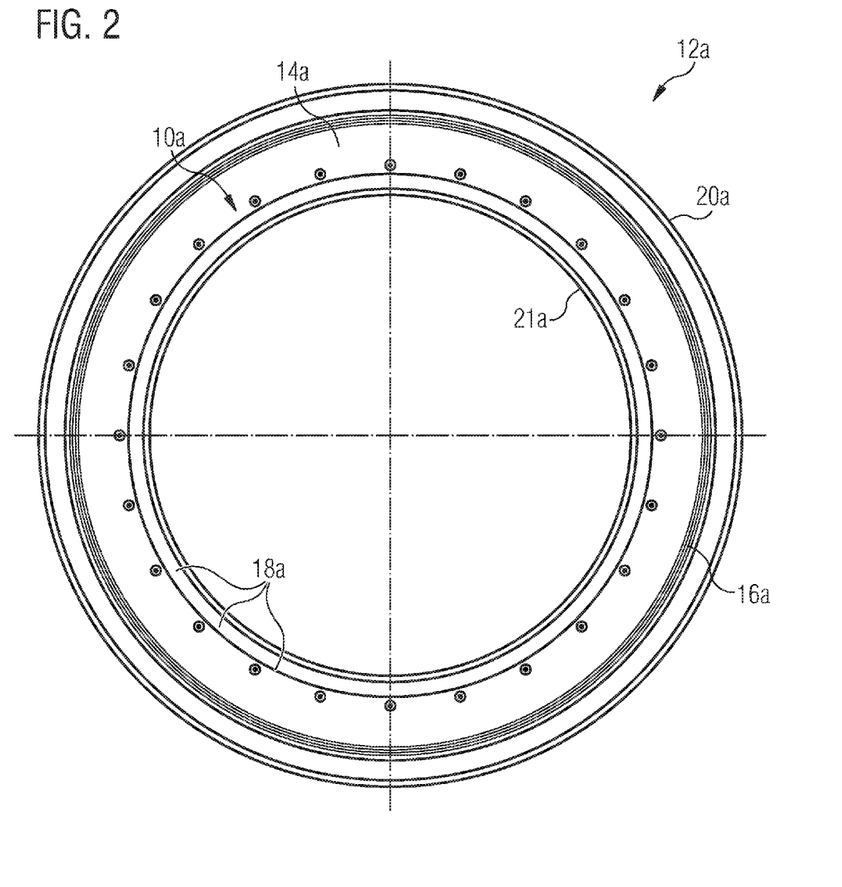
FIG. 2 is a side elevational view of a rolling-element bearing including a seal unit according to the first exemplary embodiment.

In exemplary embodiments the element 14a; 14b can be an at least part-disk shaped element 14a; 14b. FIG. 2 shows a rolling-element bearing 12a including a seal unit 10a in overview according to the first exemplary embodiment. Here the element 14a is depicted as an annular element. Alternatively, however, the element 14a can also be embodied as a plurality of parts of a ring or in the form of a disk which extends in the radial direction up to the midpoint of the bearing or also as parts of a disk. In FIG. 2 the midpoint of the bearing falls on the intersection of the two dashed lines. The element 14a; 14b can also have a diameter or radius of at least 400 mm. The outer diameter of the element 14a can, for example, be at least 400 mm, but can also take on smaller values. Furthermore, it can be seen in FIG. 2 that the attachment means 18a, screws, lie radially inward relative to the seal lip 16a. In exemplary embodiments the attachment means 18a; 18b can lie radially inward or outward relative to the seal lip 16a; 16b.

Figure 3:
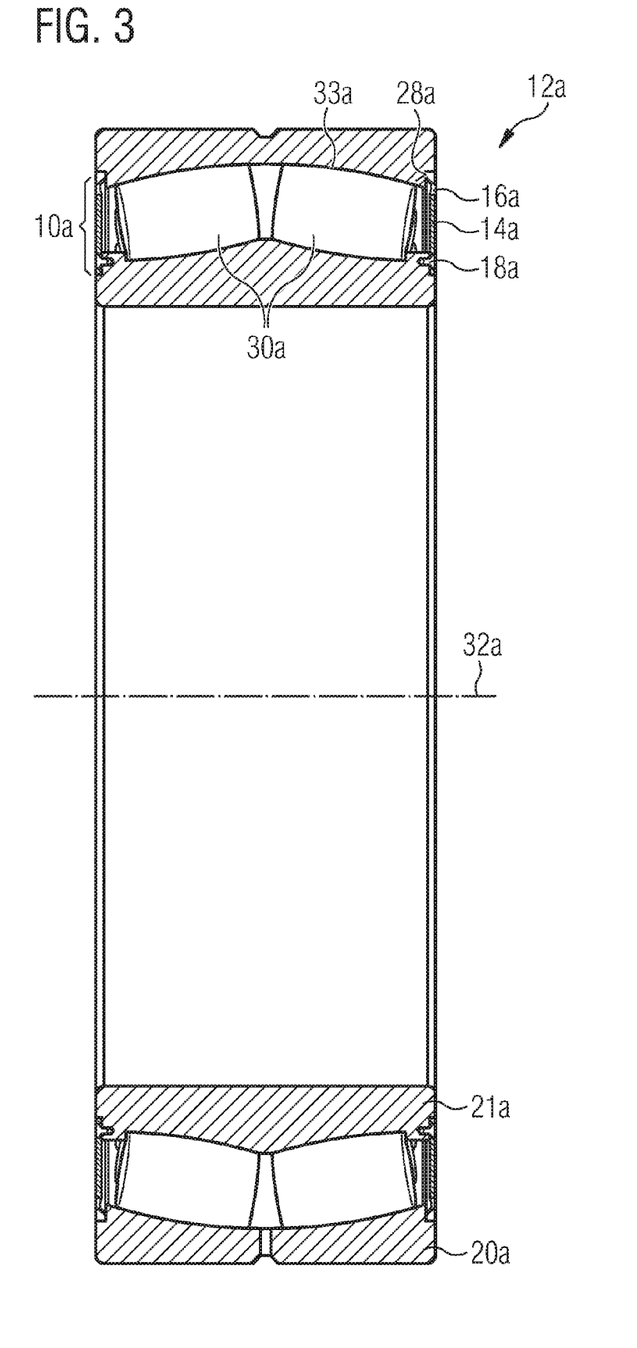
FIG. 3 is a cross-section through the rolling-element bearing according to the first exemplary embodiment.
Figure 4:
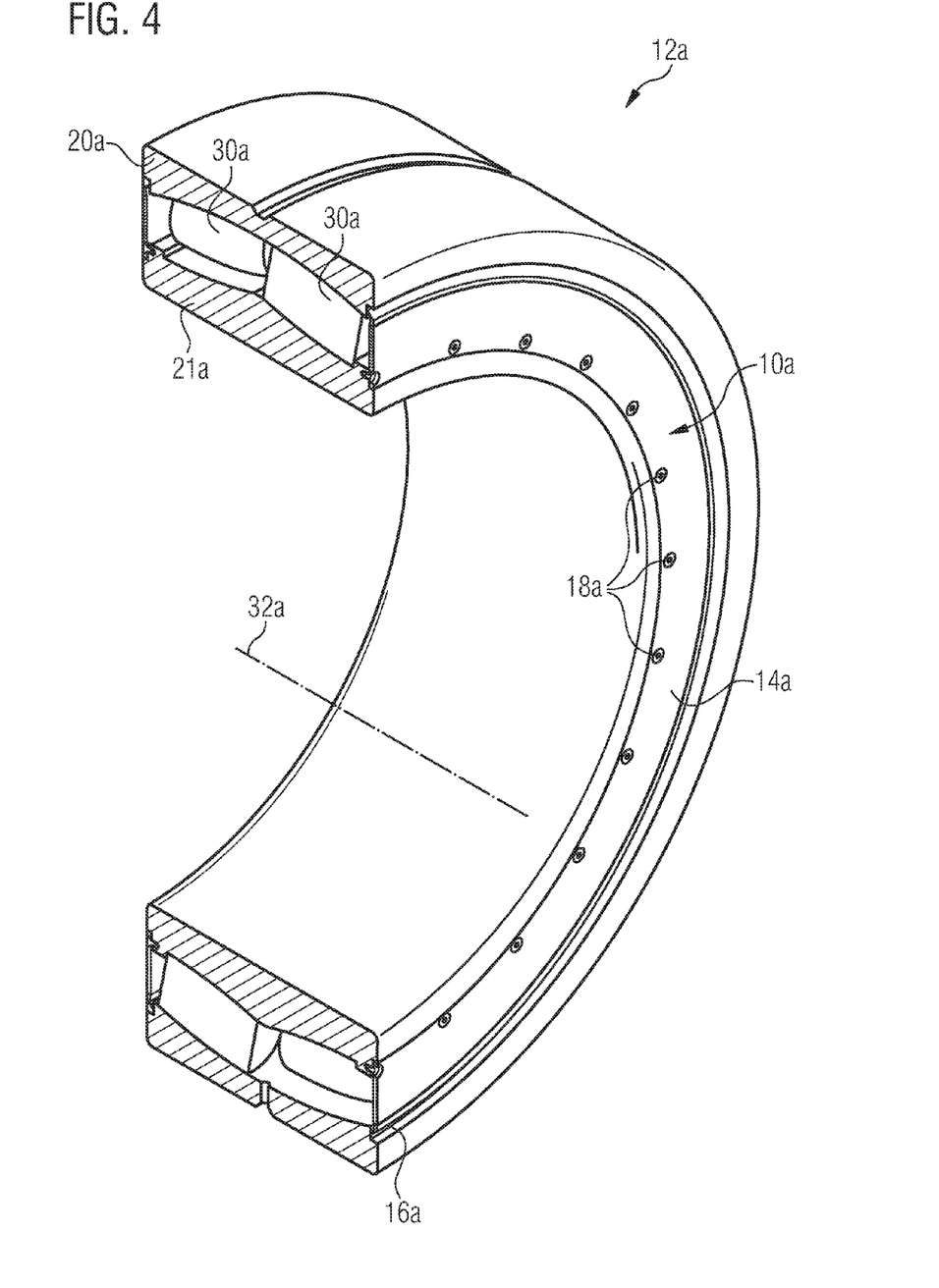
FIG. 4 is a perspective cross-section through the rolling-element bearing and seal according to the first exemplary embodiment.

FIG. 3 shows a cross-section through the rolling-element bearing 12a including the seal unit 10a in side view according to the first exemplary embodiment of FIGS. 1 and 2. A dashed line marks the axis of rotation or the central axis 32 of the rolling-element bearing 12 in the rest position. It can be clearly seen in FIG. 3 that the raceway 33a of the outer bearing ring 20a has the shape of a part of a spherical shell. In some exemplary embodiments the bearing 12a can comprise bearing rings 20a; 20b; 21a; 21b tiltable with respect to each other in a limited angle. If the bearing inner ring 21a is now tilted with respect to the bearing outer ring 20a, then with sufficiently high contact pressure in some exemplary embodiments the seal lip 16a on one side of the rolling-element bearing 12a can always remain in contact with the seal surface 28a of the outer bearing ring 20a. On the opposite side, however, the outer bearing ring 20a can slide so far over the element 14a that the seal lip 16a would then come into contact via its seal surface 22a with the raceway 33a of the bearing ring, and henceforth a sealing contact could be produced on the raceway 33a instead of on the seal surface 28a. In other words, the side of the seal lip 16a axially opposite the rolling elements 30a; 30b under normal operating conditions may come into contact with the raceway 33a when the tip of the seal lip 16a can no longer engage the seal surface 28a.

For a broader overview, FIG. 4 again shows a cross-section through the rolling-element bearing 12a including seal unit 10a in perspective view according to the first exemplary embodiment of FIGS. 1-3.

Figure 5:
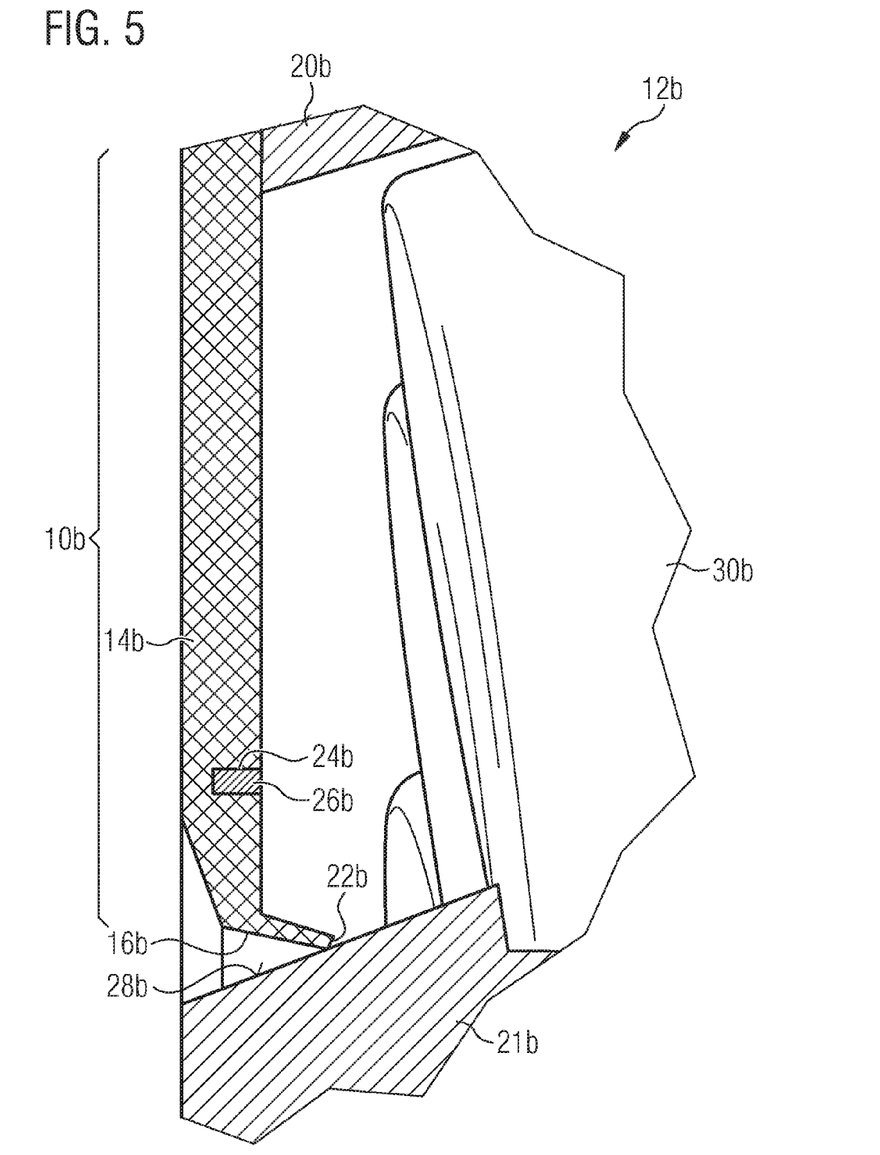
FIG. 5 is a side elevational view, partly in section, of a seal unit for a rolling-element bearing according to a second exemplary embodiment.

FIG. 5 shows a seal unit for a rolling-element bearing 12b according to a second exemplary embodiment. In some exemplary embodiments the element 14a; 14b can include a groove 24b for attaching a stiffening element 26b and/or the seal unit 10a; 10b can be formed in one piece. In FIG. 5 the seal unit 10b is formed in one-piece. In other words, the element 14b and the seal lip 16b are manufactured from the same material and in one part. The seal unit 10b also includes a groove 24b. This lies on the inside of the bearing 12b and is thus facing the rolling elements 30b. However, in other exemplary embodiments the groove 24b could also be located on the other side of the seal unit 10b. In addition, in further exemplary embodiments the groove 24b could lie closer to the seal lip 16b than to the attachment means 18b and/or the groove 24b could comprise a stiffening element 26b. FIG. 5 shows a stiffening element 26b in the groove 24b.

Figure 6:
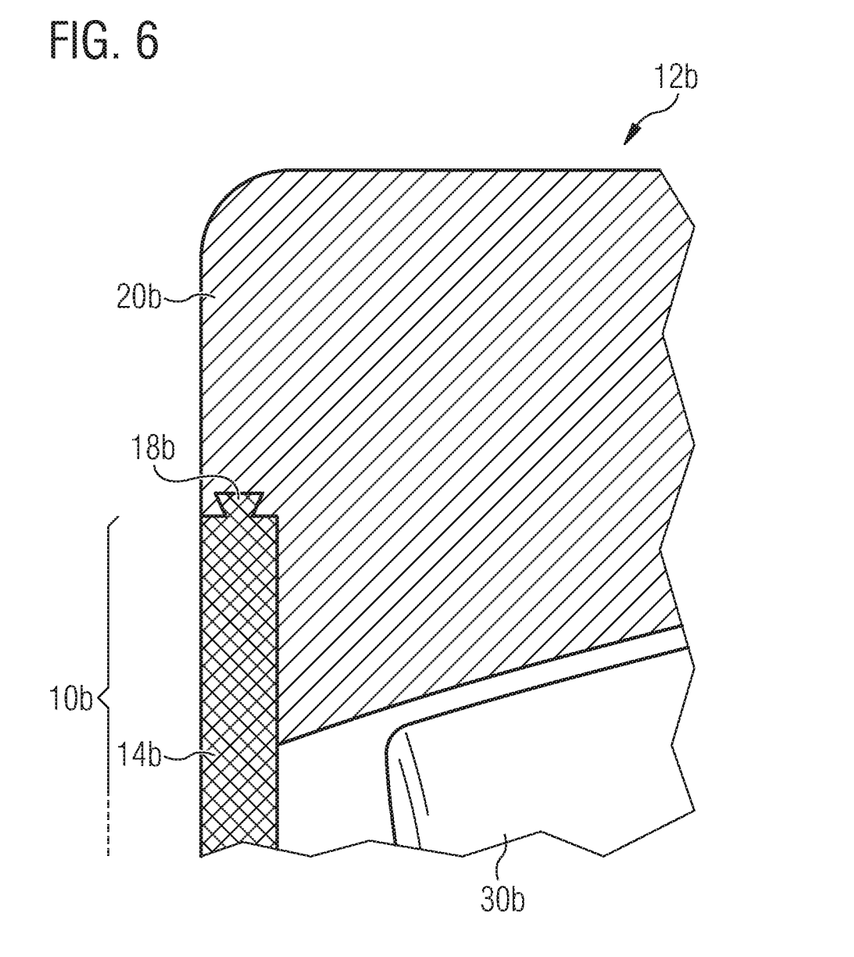
FIG. 6 shows the attachment of the seal unit according to the second exemplary embodiment to a bearing ring.

FIG. 6 shows a continuation of FIG. 5 in the radial direction outward to an end of the seal unit 10b. The attachment means 18b is shown in detail in FIG. 6 and comprises a dovetail-type, interference-fit connection. If FIG. 5 is considered together with FIG. 6, it is clear that the groove 24b lies closer to the seal lip 16b than to the attachment means 18b. However, in other exemplary embodiments the groove 24b can also be located closer to the attachment means 18b than to the seal lip 16b.

In such exemplary embodiments as are described in FIGS. 5 and 6, the stiffening element 26b can have a thermal expansion coefficient which substantially corresponds to the thermal expansion coefficient of a bearing ring 20b; 21b. Thus in FIG. 5 the thermal expansion coefficient of the stiffening element 26b could correspond to the thermal expansion coefficient of the outer bearing ring 20b, wherein, for example, there is a deviation of up to 1%, 2%, 5%, or 10%.

In exemplary embodiments the element 14a; 14b can end flush in the axial direction with at least one bearing ring 20a; 20b; 21a; 21b of the bearing 12a; 12b. In other words, the axial outer surface of the element 14a; 14b may lie in the same plane as the at least one bearing ring 20a; 20b; 21a; 21b of the bearing 12a; 12b. FIG. 6 shows an arrangement for attaching the element 14b. Here the element 14b is attached to the outer bearing ring 20b using an attachment means 18b such that a flush ending between element 14b and outer bearing ring 20b results in the axial direction. In another exemplary embodiment shown in FIG. 1, for example, an element 14a is connected to a bearing inner ring 21b such that it ends flush therewith. The element 14b in FIG. 6 is engaged via a dovetail-type formed profile into a correspondingly formed recess of the bearing outer ring 20b. In this way a simple installation and removal can be made possible. Alternatively the element 14b could also be fixed in a materially-bonded, friction-fit, or other interference-fit manner. The seal lip 16b could be fixed to the element 14b in a materially-bonded, friction-fit, or interference-fit manner. This is an alternative to a one-piece manufacturing, wherein the element 14b and the seal lip 16b are manufactured from one material.

The above-described centering by the stiffening element 26b provides for economical manufacturing possibilities and for an improved or even consistently optimal pressure distribution around the circumference of the rolling-element bearing inner ring 21b and the seal lip 16b. The attachment, depicted in FIG. 6, of the seal unit 10b could make possible a simple installation and removal. For this purpose the seal unit 10b could, e.g., be embodied as cut-apart elements, and the cut surfaces, for example, adhered or welded in the context of maintenance work. An exchange of the seal lip 16b could thus also be possible in simple manner in the field. In this way cost-intensive maintenance work on rolling-element bearing units could be reduced.

Figure 7:
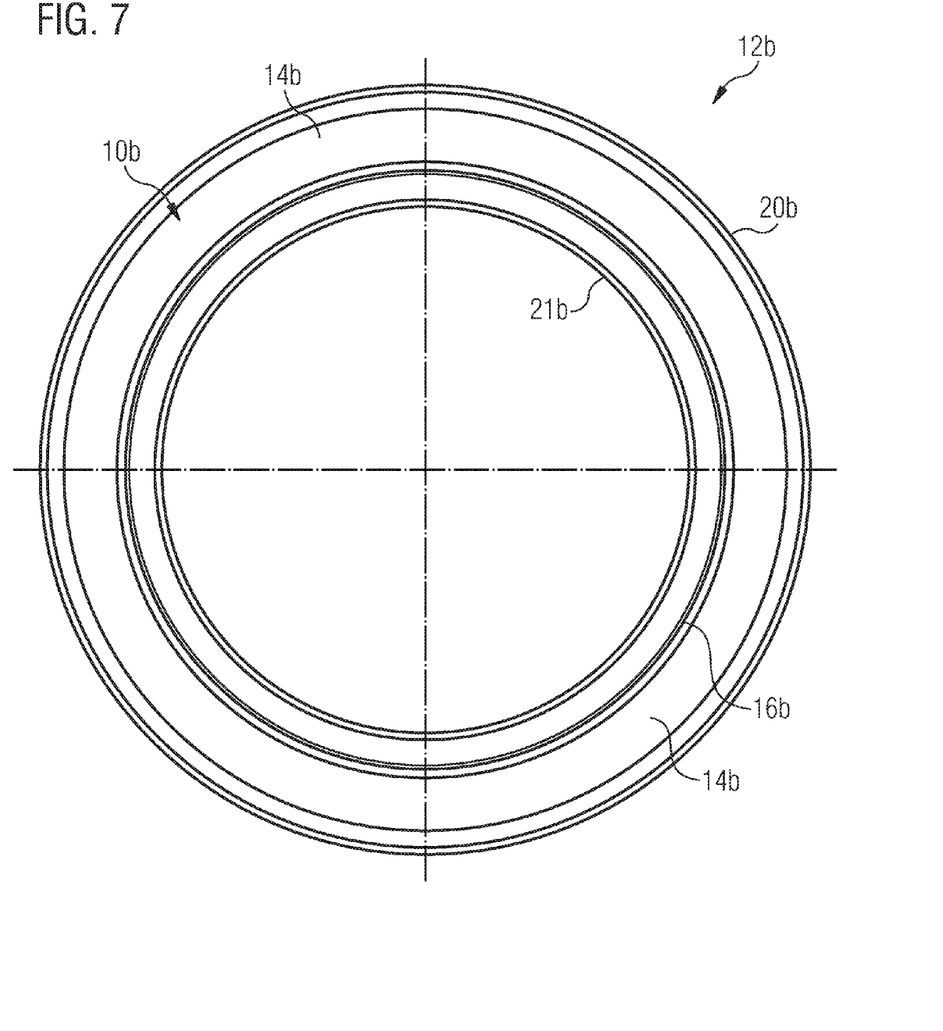
FIG. 7 is a side elevational view of the rolling-element bearing including a seal unit according to the second exemplary embodiment.
Figure 8:
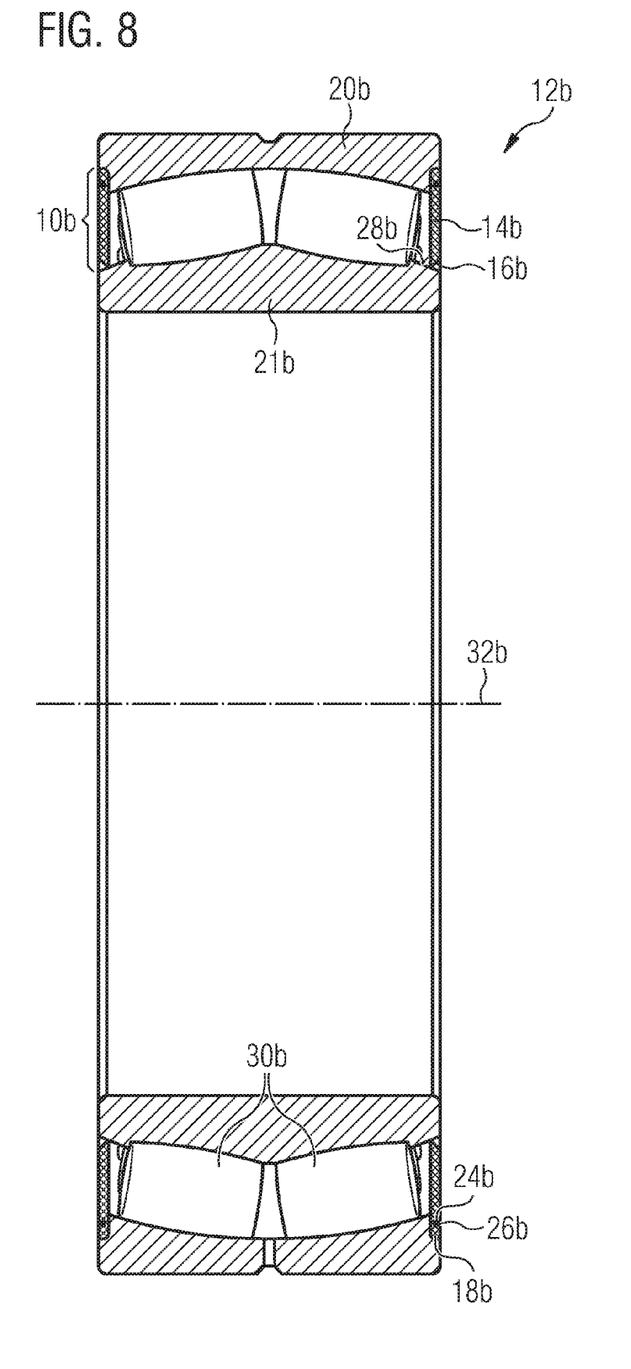
FIG. 8 is a cross-sectional side elevational view through a rolling-element bearing including a seal unit according to the second exemplary embodiment.
Figure 9:
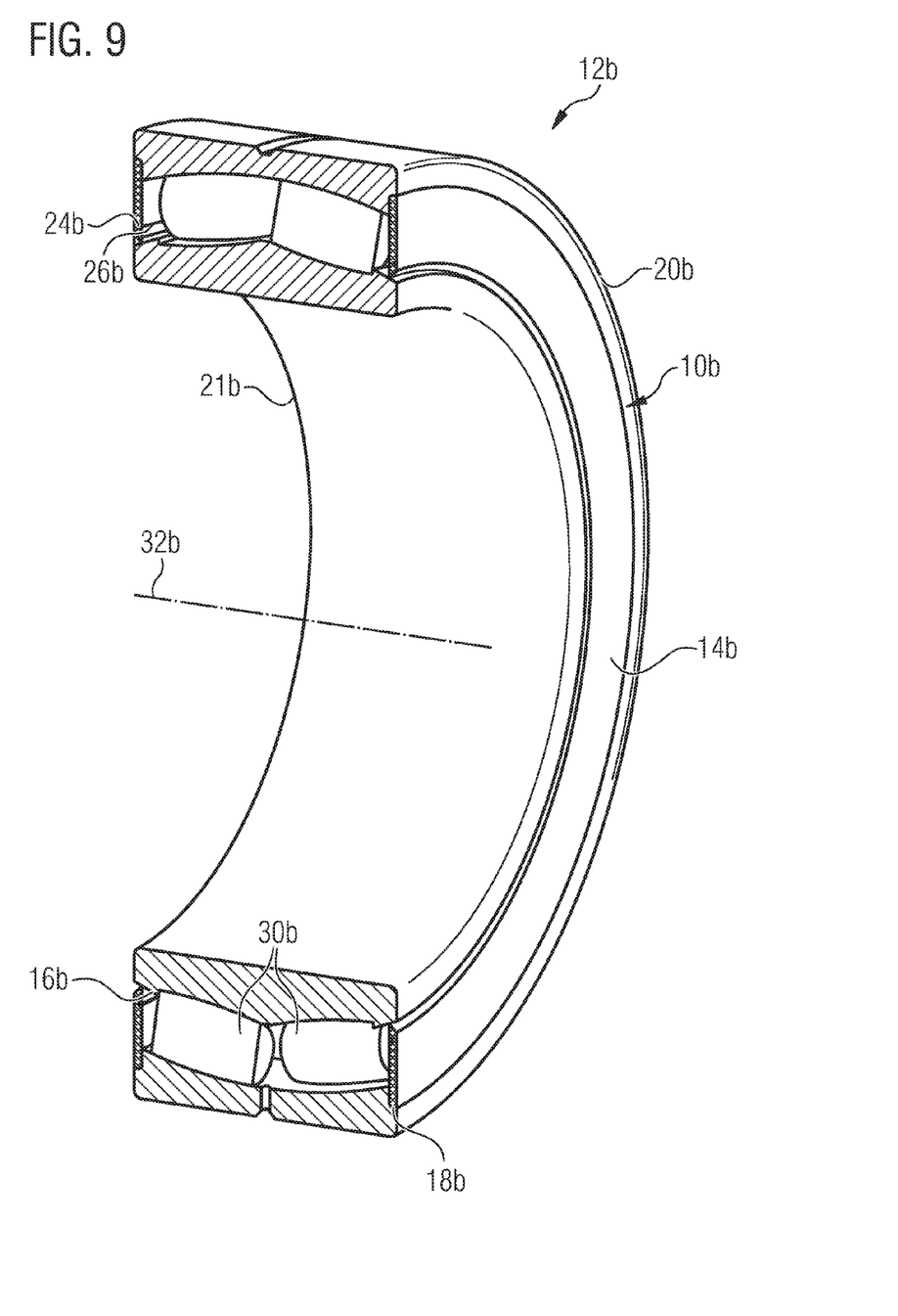
FIG. 9 is a perspective cross-section through a rolling-element bearing including a seal unit according to the second exemplary embodiment.

FIGS. 7, 8, and 9 are different views of the rolling-element bearing 12b including the seal unit 10b or cross-section thereof.

FIG. 7 shows a rolling-element bearing 12b including seal unit 10b in overview. In FIG. 8, which shows a cross-section through a rolling-element bearing 12b including seal unit 10b in side view, it is clear that with a tilting of the bearing inner ring 21b towards the bearing outer ring 20b, the seal lip 16 could also form a sealing contact with the seal surface 28b of the inner bearing ring 21b.

In FIG. 8 it can also be seen that the assembly described here allows a limited angular tilting of the bearing inner ring 21b relative to the bearing outer ring 20b. However, damage of the rolling elements 30b or of the bearing cage, the attachment means 18b on the outer ring 20b, or markings or indentations on the rolling-element bearing raceways could be avoided by the above-mentioned material choice. For this purpose the seal unit 10b could be manufactured from elastomers which have a low material stiffness. In the case of a collision with the rolling elements 30b with excessive inner-ring deflection, the seal unit 10b could thus cushion the shock. In some exemplary embodiments having interference-fit connection of the seal unit 10b to the bearing outer ring 20b, the seal unit 10b could be pushed out of the interference-fit connection here. In this way greater damage could be avoided.

Finally, FIG. 9 shows a cross-section through a rolling-element bearing 12b including seal unit 10b in perspective view.

In FIGS. 5-9 the seal unit 10b includes a part-disk or part-ring shaped element 14b, which for example could be manufactured from polyurethane, NBR, HNBR, or similar known seal materials, and a seal lip 16b is formed on its inner radius. The element 14b and the seal lip 16b could thus be formed from a material as one piece. As is exemplarily depicted in FIGS. 5-9, in some exemplary embodiments the seal unit 10b can be realized by an element 14b and a seal lip 16b formed on an inner diameter of the at least part-ring shaped element 14b. The element 14b mentioned represents a ring which can be manufactured in multiple segments or cut or formed from one piece. In the case of the cut embodiment, the connection of the cut surfaces could be accomplished, for example, by adhering, welding, or similar.

The materials used in exemplary embodiments could make possible a mass production, for example, using injection molding or vulcanization. These methods are known and established. The manufacturing costs to be expected per piece could optionally be reduced to a very low level.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seals for bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10a; 10b Seal unit
12a; 12b Rolling-element bearing
14a; 14b Element
16a; 16b Seal lips
18a; 18b Attachment means
20a; 20b Bearing outer ring
21a; 21b Bearing inner ring
22a; 22b Seal surface of the seal lip
24b Groove
26b Stiffening element
28a; 28b Seal surface of the bearing ring
30a; 30b Rolling elements
32a; 32b Central axis in rest position
33a; 33b Raceway of the outer ring
112 Large bearing
114 Labyrinth ring
116 V-ring
120 Bearing ring
130 Rolling elements
140 Labyrinth

We claim:

1. A seal unit for a rolling-element bearing having an inner bearing ring and an outer bearing ring, the seal unit comprising an at least part-ring shaped element having a seal lip, the at least part-ring shaped element being configured for attachment to the inner bearing ring, and wherein the outer bearing ring is tiltable through a limited angle with respect to the inner bearing ring, wherein the at least part-disk shaped element includes a groove and a stiffening element is included in the groove.

2. The seal unit according to claim 1, wherein the at least part-ring shaped element is an at least part-disk shaped element or has a diameter of at least 400 millimeters.

3. The seal unit according to claim 1, wherein a seal surface of the seal lip extends through a plane of an axial side wall of the at least part-ring shaped element in the axial direction.

4. The seal unit according to claim 1, wherein the seal unit is formed as one-piece.

5. The seal unit according to claim 1, wherein the groove lies closer to the seal lip than to an attachment location of the at least part-ring shaped element and the inner bearing ring.

6. The seal unit according to claim 1, wherein an attachment location of the at least part-ring shaped element and the inner bearing ring lies radially inward or outward of the seal lip.

7. The seal unit according to claim 1, wherein the seal unit is exchangeably connectable to the inner bearing ring.

8. The seal unit according to claim 1, wherein the at least part-ring shaped element is an at least part-disk shaped element and has a diameter of at least 400 millimeters, wherein a seal surface of the seal lip extends through a plane of an axial side wall of the at least part-ring shaped element in the axial direction, wherein the groove lies closer to the seal lip than to an attachment location of the at least part-ring shaped element and the inner bearing ring.

9. The seal unit according to claim 1, wherein the at least part-ring shaped element comprises an at least part-ring shaped seal body having first and second substantially planar sidewalls bounded by first and second parallel planes and the seal lip projecting radially from the seal body, the seal lip having an outer end lying on a side of the first plane opposite from the second plane.

10. The seal unit according to claim 9, wherein the seal lip extends through the first plane.

11. A rolling-element bearing including a seal unit according to claim 1, wherein the at least part-ring shaped element ends flush in the axial direction with at least one bearing ring of the bearing.

12. The rolling-element bearing according to claim 11, wherein stiffening element having a thermal expansion coefficient which substantially corresponds to a thermal expansion coefficient of the inner bearing ring.

13. A rolling-element bearing comprising:
a first bearing ring having a first raceway;
a second bearing ring having a second raceway and a sealing surface axially outward of the second raceway; and
a seal unit comprising an at least part-ring shaped seal body connected to the first bearing ring, the seal unit having first and second substantially planar sidewalls bounded by first and second parallel planes and a seal lip projecting radially from the seal body and axially from the first plane away from the second plane, wherein the at least part-ring shaped seal body includes a groove and a stiffening element is included in the groove.

* * * * *